No. 786,075. PATENTED MAR. 28, 1905.
F. WARTHER.
PNEUMATIC ACTUATING DEVICE FOR THE REVERSING GEARS
OF LOCOMOTIVES.
APPLICATION FILED AUG. 6, 1904.
3 SHEETS—SHEET 3.
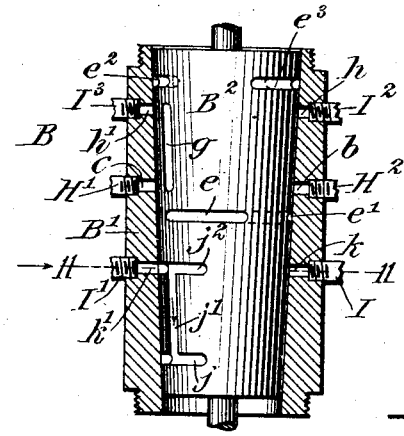
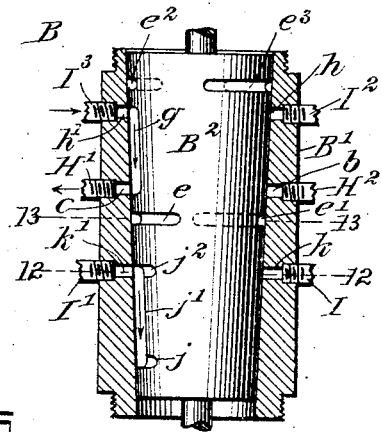
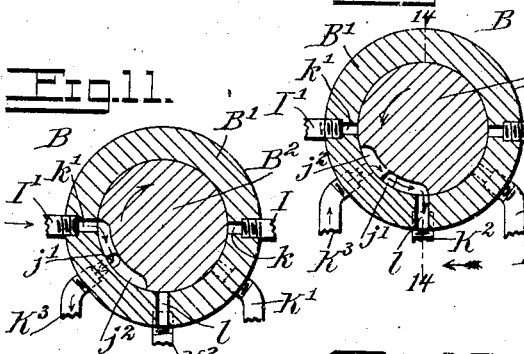
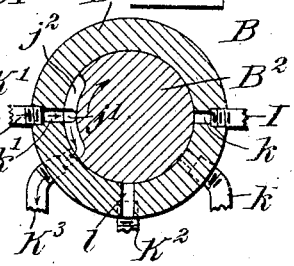
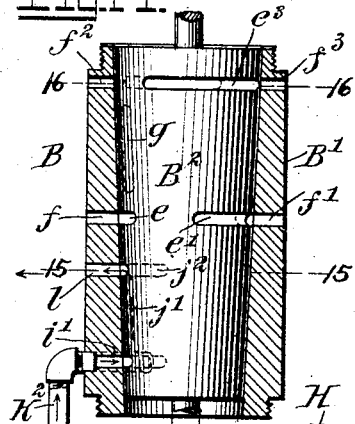
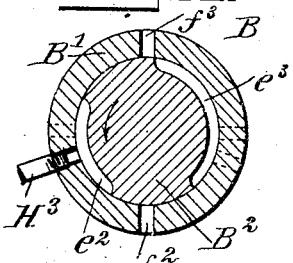
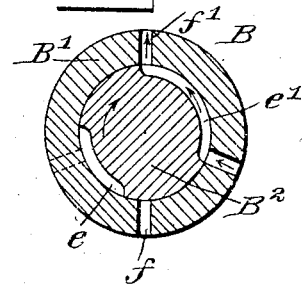
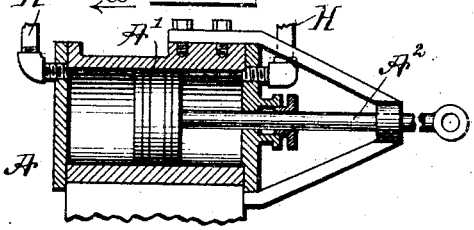
WITNESSES:
L. Almquist
Rev. G. Hosler
INVENTOR
Fred Warther
BY
ATTORNEYS No. 786,075. Patented March 28, 1905.

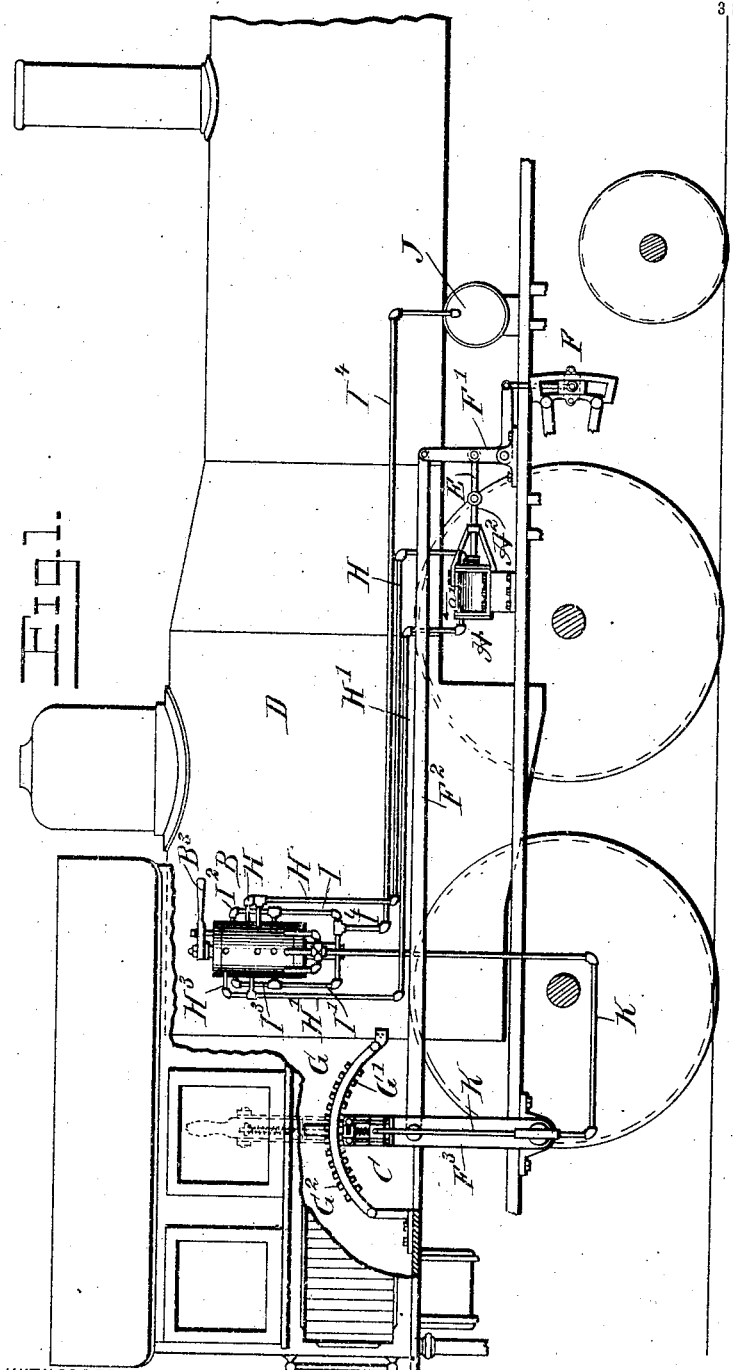

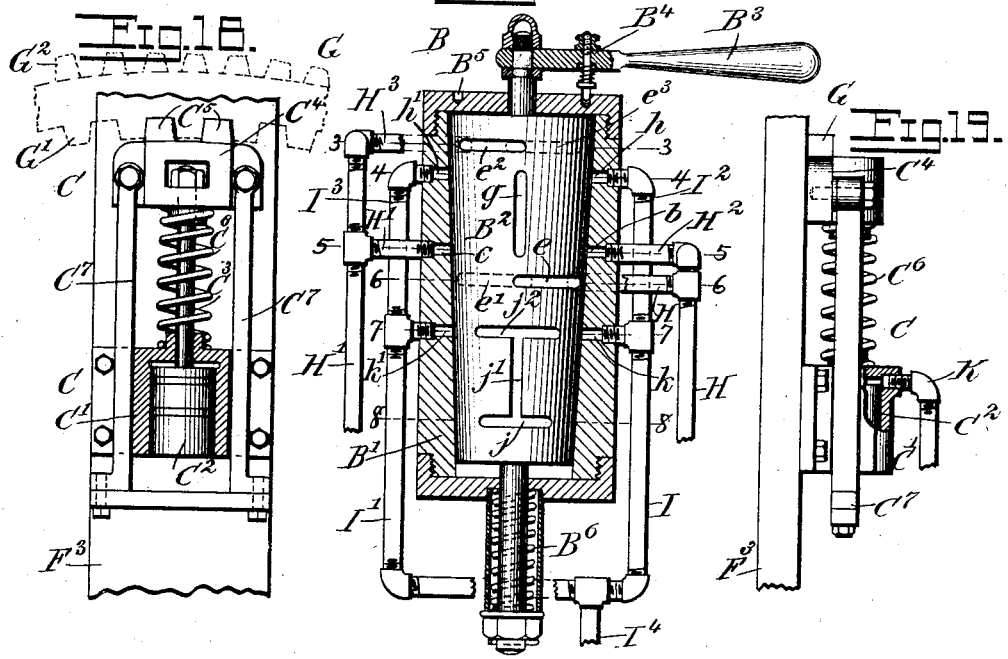
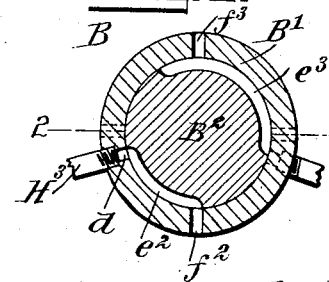
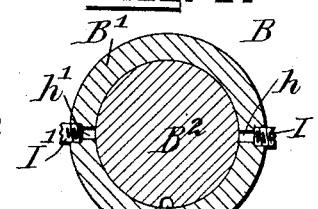
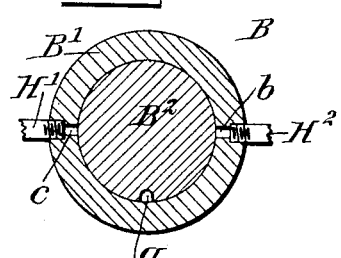
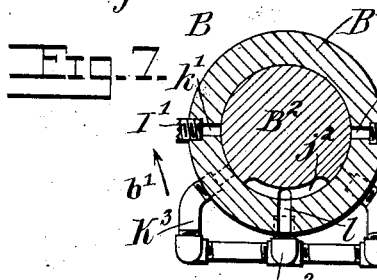
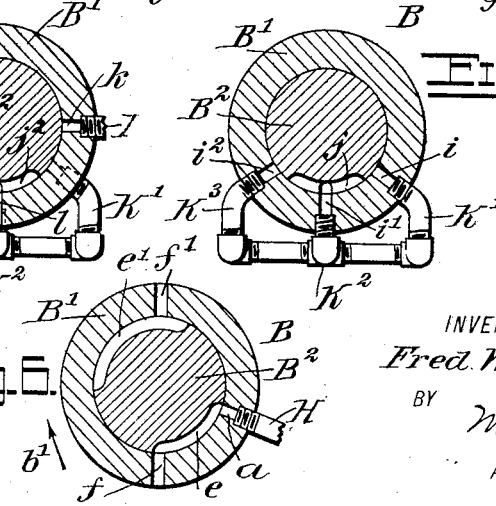

UNITED STATES PATENT OFFICE.

FRED WARTHER, OF CANAL DOVER, OHIO.

PNEUMATIC ACTUATING DEVICE FOR THE REVERSING-GEARS OF LOCOMOTIVES.

SPECIFICATION forming part of Letters Patent No. 786,075, dated March 28, 1905.

Application filed August 6, 1904. Serial No. 219,772.

*To all whom it may concern:*

Be it known that I, FRED WARTHER, a citizen of the United States, and a resident of Canal Dover, in the county of Tuscarawas and State of Ohio, have invented a new and Improved Pneumatic Actuating Device for the Reversing-Gears of Locomotives, of which the following is a full, clear, and exact description.

The object of the invention is to provide a new and improved pneumatic actuating device for the reversing-gear of a locomotive arranged to permit the engineer to quickly reverse the engine whenever desired without exerting much physical force.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a sectional side elevation of a locomotive equipped with the improvement. Fig. 2 is an enlarged sectional side elevation of the manually-controlled controlling-valve, the section being on the line 2 2 of Fig. 3. Fig. 3 is a sectional plan view of the same on the line 3 3 of Fig. 2. Fig. 4 is a like view of the same on the line 4 4 of Fig. 2. Fig. 5 is a similar view of the same on the line 5 5 of Fig. 2. Fig. 6 is a similar view of the same on the line 6 6 of Fig. 2. Fig. 7 is a like view of the same on the line 7 7 of Fig. 2. Fig. 8 is a similar view of the same on the line 8 8 of Fig. 2. Figs. 9 and 10 are sectional side elevations of the same, showing the valve-plug in different positions. Fig. 11 is a sectional plan view of the same on the line 11 11 of Fig. 9. Fig. 12 is a similar view of the same on the line 12 12 of Fig. 10. Fig. 13 is a like view of the same on the line 13 13 of Fig. 10. Fig. 14 is a transverse section of the controlling-valve, the section being on the line 14 14 of Fig. 15. Fig. 15 is a sectional plan view of the same on the line 15 15 of Fig. 14. Fig. 16 is a like view of the same on the line 16 16 of Fig. 14. Fig. 17 is a longitudinal sectional elevation of the air-cylinder connected with the reversing-gear and controlled from the controlling-valve. Fig. 18 is an enlarged sectional side elevation of the locking mechanism for the reversing-lever; and Fig. 19 is an edge view of the same, parts being in section.

The pneumatic actuating device consists, essentially, of an air-cylinder A, a controlling-valve B for controlling the admission and exhaust of air to and from the said cylinder, and a pneumatically-actuated locking device C, controlled from the controlling-valve B in advance of the cylinder A. The latter is mounted on the frame of the locomotive D, and the piston $A'$ of the cylinder (see Fig. 17) has its piston-rod $A^2$ pivotally connected by a link E with the vertical arm of the bell-crank or lifting lever $F'$ of the usual reversing-gear F for the locomotive. The bell-crank lever $F'$ is connected at its vertical member by a rod $F^2$ with an engineer's reversing-lever $F^3$, adapted to be locked to a segment G by the pneumatically-actuated locking device C, as plainly indicated in Figs. 1, 18, and 19.

The controlling-valve B is located in the cab of the locomotive D and is provided with a valve-casing $B'$, in which is mounted to turn a valve-plug $B^2$, carrying on its upper end a handle $B^3$, adapted to be turned by the engineer from a normal position either to the left and returned to a normal position or from the normal position to the right and back to a normal position. On moving the handle $B^3$ from the normal position to the left the piston $A'$ is caused to travel in the direction of the arrow $a'$ (see Figs. 1 and 17) to cause a lifting of the links of the reversing-gear and a consequent reversing of the engine, and when the handle $B^3$ is moved from a normal position to the right the piston $A'$ is caused to travel in the inverse direction of the arrow $a'$ to cause a dropping of the links and consequent change of the reversing-gear for the engine to run forward. For the purpose mentioned the ends of the cylinder A are connected by pipes H and $H'$ with the controlling-valve B in such a manner that the pipe H and the branch pipe $H^2$ thereof lead to ports $a$ and $b$ in the valve-casing $B'$, (see Figs. 6 and 5,)

and the pipe H' and the branch pipe H³ thereof connect with ports c and d (see Figs. 5 and 3) in the valve-casing B'.

When the valve-plug B² is in a normal position, as shown in Figs. 2 and 6, inclusive, then the port a registers with a horizontally-disposed channel e, formed in the peripheral face of the plug B² (see Figs. 2 and 6) and leading to an exhaust-port f, formed in the valve-casing B' and leading to the outer air, so that the forward end of the cylinder A is now in communication with the outer air by way of the pipe H, port a, channel e, and exhaust-port f. A channel e', similar to the channel e and located diametrically opposite the said channel e, is adapted to connect the port a with an exhaust-port f' on giving about a quarter-turn to the valve-plug B² in the direction of the arrow b'. The port b, connected with the branch pipe H³ of the pipe H', leading to the rear end of the cylinder A, is adapted to be similarly connected with the atmosphere by the employment of channels e² and e³, formed in the peripheral face of the valve-plug B² and located diametrically opposite each other, as plainly indicated in Fig. 3. The channel e² is adapted to connect the port d with an exhaust-port f², and the other channel e³ is adapted to connect the port d with an exhaust-port f³, the same as above described in reference to the ports a f and a f'.

The ports b and c (see Fig. 5) are adapted to connect with a vertically-disposed channel g, formed in the peripheral face of the valve-plug B², and this channel g is adapted to connect with an air-inlet port h or with an air-inlet port h'—that is, when the channel g connects with the port b then it also connects with the port h (see Fig. 2) and when the plug B² is turned and the channel g connects with the port c then it also connects with the air-inlet port h'. The ports h and h' connect with the branch pipes I² and I³ of air-admission pipes I and I', leading to a common supply-pipe I⁴ and connected with an air-reservoir J, filled with compressed air and located on the frame of the locomotive, as illustrated in Fig. 1. When the channel g connects the ports h and b with each other, then compressed air from the reservoir J can pass by way of the pipe I⁴, pipe I, and branch pipe I² into the port h, through the channel g and port b into the branch pipe H², and pipe H to the forward end of the cylinder A to act on the piston A' therein and force the same rearward in the direction of the arrow a' for lifting the links to reverse the engine, as previously explained. When the channel g connects the ports h' and c with each other, then air from the reservoir J passes by way of the pipes I⁴, I', and I³, port h', channel g, and port c into the pipe H' and to the rear end of the cylinder A to force the piston A' therein forward in the inverse direction of the arrow a' to change the position of the reversing-gear to again run the engine in a forward direction.

Previous to admitting compressed air into either end of the cylinder A it is necessary to unlock the lever F³ to allow the piston A' to move, and for this purpose the following arrangement is made, it being understood that after the piston has moved to the end of its stroke and the handle B³ has returned to a normal position then the locking device C is returned into a locking position to lock the lever F³ against movement, the air in the cylinder in the meantime being allowed to escape through the corresponding exhaust-port. The pneumatically-actuated locking device C (see Figs. 18 and 19) is provided with a cylinder C', secured to the lever F³, and in the said cylinder reciprocates a piston C², having its piston-rod C³ connected with a block C⁴, carrying teeth C⁵, adapted to engage teeth G' on the segment G to lock the lever F³ in position on the said segment. A spring C⁶ presses against the block C⁴, so as to hold the teeth C⁵ thereof normally in engagement with the teeth G' of the segment. The block C⁴ is provided with a guiding-drum C⁷, mounted to slide on suitable bearings on the cylinder C' to properly guide the block in its up-and-down movement. Into the upper end of the cylinder C' leads a pipe K for conducting compressed air into the said cylinder to push the piston C² downward therein to withdraw the teeth C⁵ of the block C⁴ from the teeth G' of the segment to unlock the lever F³, it being understood that when this takes place the spring C⁶ is compressed. When the pipe K is connected with the atmosphere, as hereinafter more fully described, then the spring C⁶ pushes the block C⁴ back to its former position to engage the teeth C⁵ with the teeth G' of the segment G to again lock the lever F³ in position. It is understood that when the block C⁴ moves upward the piston C² is returned to the normal locking position. (Shown in Figs. 18 and 19.)

The pipe K referred to extends to the controlling-valve B and is provided with three branch pipes K', K², and K³, leading to ports i, i', and i², respectively, formed in the casing B', as plainly indicated in Fig. 8. The ports i i' are adapted to be connected with each other by a horizontally-disposed channel j, formed in the peripheral face of the plug B², and this channel j also serves to connect the ports i' and i² with each other, as hereinafter more fully explained. From the channel j extends upwardly a channel j', leading to a horizontally-disposed channel j², adapted to connect with either of the air-inlet ports h or h', connected with the pipes I and I', as plainly shown in Figs. 2 and 7, the said channel j² being also adapted to register with an exhaust-port l, formed in the casing B', as shown in Fig. 7.

When the plug B² is in a normal position, as illustrated in Figs. 2 to 8, inclusive, then the channel $j^2$ is out of register with both of the ports $k$ and $k'$; but when the plug $B^2$ is turned to connect the channel $j^2$ with the port $k$ then compressed air can pass by way of the pipe I, port $k$, and channels $j^2$, $j'$, and $j$ to the port $i$, from which the air passes by way of the pipes K and K' to the upper end of the cylinder C' to force the piston $C^2$ down therein to unlock the lever $F^3$, as previously explained. When the plug $B^2$ is turned in the reverse direction, then the channel $j^2$ is connected with the port $k'$ to allow compressed air to pass by way of the pipe I', port $k'$, and channels $j^2$, $j'$, and $j$ to the port $i^2$ and by way of the pipes $K^3$ and K to the cylinder C' to force the piston $C^2$ downward therein. The arrangement is such that the channel $j^2$ connects with either port $k$ or $k'$ previous to the channel $g$ connecting either the ports $h$ and $b'$ or $h'$ and $c$ with each other, and hence the piston $C^2$ is pushed downward in its cylinder C' by air-pressure to unlock the lever $F^3$ previous to any compressed air passing into the other end of the cylinder A.

It is understood that whenever the valve-plug $B^2$ is returned to a normal position then the channel $j^2$ registers with the exhaust-port $l$, so that the air from the cylinder C' can pass to the atmosphere by way of the pipes K $K^2$, port $i'$, channels $j$, $j'$, and $j^2$, and exhaust-port $l$, and hence when the engineer has caused the piston A' to travel to either end of the cylinder and the handle $B^3$ is returned to an intermediate position then the locking device C immediately locks the lever $F^3$ and the segment G to hold the reversing-gear in the corresponding position irrespective of any pressure in the cylinder A. It is, however, understood that when this takes place the corresponding end of the cylinder is connected by way of the controlling-valve B with the atmosphere to immediately allow the air to escape from the cylinder, as previously explained.

The handle $B^3$ is preferably provided with a spring-pressed locking-pawl $B^4$, engaging corresponding recesses $B^5$ in the top of the casing B' to hold the handle $B^3$ against accidental movement.

In order to insure a proper feeding of the plug $B^2$ in the casing, the said plug is pressed on by a spring $B^6$, as indicated in Fig. 2.

In case the pneumatic device described should fail to operate—that is, the reservoir J is without air—then the lever $F^3$ may be manipulated by attaching a handle to the lever $F^3$, the handle having a locking device for engagement with the teeth $G^2$ on the outer face of the segment G. In this case the engineer controls the lever $F^3$ the same as the ordinary lever now in use.

Having thus described my invention, I claim as new and desire to secure by Letters Patent—

1. A pneumatic actuating device for the reversing-gear of a locomotive, comprising an air-cylinder containing a piston connected with the reversing-gear for actuating the same, a controlling-valve having a valve-casing and a single valve-plug adapted to be turned in the casing by the engineer, pipes connecting the ends of the air-cylinder with the said valve-casing, and a compressed-air supply connected with the said valve-casing, the latter having admitting-ports and exhaust-ports at varying heights thereof, and the valve-plug having connecting-channels at correspondingly varying heights for connecting the proper ports with each other on turning the valve-plug.

2. A pneumatic actuating device for the reversing-gear of a locomotive, comprising an air-cylinder containing a piston connected with the reversing-gear for actuating the same, a controlling-valve having a valve-casing and a valve-plug adapted to be turned in the casing by the engineer, pipes connecting the ends of the air-cylinder with the said valve-casing, a compressed-air supply connected with the said valve-casing, a locking device having a cylinder fixed to a part of the reversing-gear, a piston movable in the said locking-device cylinder, a spring-pressed toothed locking-block carried by the piston-rod of the said piston, a toothed fixed segment adapted to be engaged by the said locking-block, and a pipe leading from the said locking-device cylinder and connected by branch pipes with the said valve-casing, the latter having admission-ports and exhaust-ports and the valve-plug having connecting-channels for the said ports, to admit compressed air from the said air-supply to the locking-device cylinder immediately previous to admitting air to either end of the said air-cylinder.

In testimony whereof I have signed my name to this specification in the presence of two subscribing witnesses.

FRED WARTHER.

Witnesses:
 CHARLEY GRUNDER,
 J. D. T. BOLD.